(12) United States Patent
Witte et al.

(10) Patent No.: US 10,105,939 B2
(45) Date of Patent: Oct. 23, 2018

(54) SUPPORT MANDREL, METHOD AND SYSTEM FOR PRODUCING CURVED COMPOSITE COMPONENTS

(71) Applicant: Airbus Operations GmbH, Hamburg (DE)

(72) Inventors: Tassilo Witte, Hamburg (DE); Johann-Christian Koerbelin, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 234 days.

(21) Appl. No.: 14/823,003

(22) Filed: Aug. 11, 2015

(65) Prior Publication Data
US 2016/0046113 A1   Feb. 18, 2016

(30) Foreign Application Priority Data

Aug. 14, 2014   (DE) ........................ 10 2014 216 160

(51) Int. Cl.
| | |
|---|---|
| *B29C 70/30* | (2006.01) |
| *B32B 37/14* | (2006.01) |
| *B32B 37/06* | (2006.01) |
| *B32B 38/00* | (2006.01) |
| *B29D 99/00* | (2010.01) |
| *B29C 53/08* | (2006.01) |

(Continued)

(52) U.S. Cl.
CPC .............. *B32B 37/14* (2013.01); *B29C 33/50* (2013.01); *B29C 53/083* (2013.01); *B29C 70/30* (2013.01); *B29D 99/0003* (2013.01); *B32B 37/06* (2013.01); *B32B 38/0004* (2013.01); *B29L 2031/001* (2013.01); *B29L 2031/7739* (2013.01); *B32B 2305/076* (2013.01)

(58) Field of Classification Search
None
See application file for complete search history.

(56) References Cited

U.S. PATENT DOCUMENTS

| | | | | |
|---|---|---|---|---|
| 2006/0108057 | A1* | 5/2006 | Pham | B29C 70/345 156/245 |
| 2010/0006739 | A1* | 1/2010 | Robins | B29C 33/505 249/64 |

(Continued)

FOREIGN PATENT DOCUMENTS

| | | |
|---|---|---|
| DE | 102008028865 | 12/2009 |
| DE | 102011119220 | 5/2013 |

(Continued)

OTHER PUBLICATIONS

German Search Report, dated Aug. 7, 2015, priority document.

*Primary Examiner* — Barbara J Musser
(74) *Attorney, Agent, or Firm* — Greer, Burns & Crain, Ltd.

(57) ABSTRACT

A support mandrel for producing curved composite components includes a prismatoid mandrel body formed from a flexible material, the mandrel body having two polygonal bases and an upper support surface extending between the two polygonal bases of the mandrel body, and a reinforcement bar enclosed within the mandrel body and extending between the two polygonal bases of the mandrel body substantially parallel and near to the upper support surface of the mandrel body.

14 Claims, 2 Drawing Sheets

(51) Int. Cl.
 B29C 33/50 (2006.01)
 B29L 31/00 (2006.01)

(56) References Cited

U.S. PATENT DOCUMENTS

2011/0104432 A1* 5/2011 Duqueine ............. B29C 33/405
 428/113
2013/0233474 A1 9/2013 De Mattia
2013/0327472 A1 12/2013 De Mattia

FOREIGN PATENT DOCUMENTS

EP 2639047 9/2013
EP 2674278 12/2013

* cited by examiner

SUPPORT MANDREL, METHOD AND SYSTEM FOR PRODUCING CURVED COMPOSITE COMPONENTS

CROSS-REFERENCES TO RELATED APPLICATIONS

This application claims the benefit of the German patent application No. 102014216160.6 filed on Aug. 14, 2014, the entire disclosures of which are incorporated herein by way of reference.

BACKGROUND OF THE INVENTION

The present invention relates to a support mandrel, a method and a system for producing curved composite components, particularly curved prepreg frames for use as structural components in aircraft or spacecraft.

Producing curved parts from prepreg preforms for use as structural components in aircraft fuselages requires reproducible methods for achieving the desired curvature. Specifically fiber composite components need to be handled carefully in order not to have the fibers spread or wrinkle uncontrollably.

The document US 2011/0104432 A1 discloses applying a composite strip formed of unidirectional reinforcing fibers longitudinally on a silicone flexible mandrel. The strip is compacted under vacuum to confer the specific shape of the mandrel to it, and the resulting strip is deposited on a heated metal tool having a curve that complements the shape of the mandrel.

The document DE 10 2011 119 220 A1 discloses a device having an elongated resilient carrier for carrying a biaxial elongated web-like semi-finished product that is made from a composite material. Fibers include an angle in relation to a longitudinal axis of the carrier. A bendable-resilient armature supports a neutral fiber of the semi-finished product in the carrier. A working drive forms a curvature of the carrier with the semi-finished product.

The document DE 10 2008 028 865 A1 discloses a profile preform for producing a composite profile member, comprising a fibrous material semi-finished product arranged along an elongate mandrel, the profile preform being bendable and twistable according to a desired curvature and/or torsion of the profile component to be produced.

SUMMARY OF THE INVENTION

One idea of the invention is thus to provide solutions for forming curved composite components having a two-dimensional cross section that can be readily automated and implemented as continuous workflow.

A first aspect of the invention pertains to a support mandrel for producing curved composite components, the support mandrel comprising a prismatoid mandrel body formed from a flexible material, the mandrel body having two polygonal bases and an upper support surface extending between the two polygonal bases of the mandrel body, and a reinforcement bar enclosed within the mandrel body and extending between the two polygonal bases of the mandrel body substantially parallel and near to the upper support surface of the mandrel body.

According to a second aspect of the invention, a system for producing curved composite components comprises a support mandrel according to the first aspect of the invention, a layup forming assembly configured to form a prepreg layup from prepreg strips on a flat surface and to transfer the layup to the upper support surface of the mandrel body of the support mandrel, and a forming wheel configured to bend the support mandrel and a prepreg layup formed on the upper support surface to a curved shape.

According to a third aspect of the invention, a method for producing curved composite components comprises laying up a prepreg layup from prepreg strips; cross-forming the prepreg layup on an upper support surface of a support mandrel, the support mandrel comprising a prismatic mandrel body formed from a flexible material, the mandrel body having two polygonal bases and an upper support surface extending between the two polygonal bases of the mandrel body, and a reinforcement bar enclosed within the mandrel body and extending between the two polygonal bases of the mandrel body substantially parallel and near to the upper support surface of the mandrel body; and bending the support mandrel and the prepreg layup on the upper support surface with a forming wheel.

Key to the present invention is the development of a method for manufacturing curved composite parts from prepregs that is able to avoid wrinkles, overlaps or similar quality diminishing faults during the formation of the curvature. A main idea is to use a flexible support mandrel having a predetermined cross sectional shape and advantageously shift the neutral bending axis of the support mandrel towards the bending pressure region. This is done by adding stiffening components within the flexible support mandrel. Those stiffening components are harder to compress than the rest of the support mandrel, leading to a relocation of the neutral axis towards the location of the stiffening components.

This relocation of the neutral axis due to the use of stiffening components within the support mandrel advantageously leads to a reduction of the fiber compression region, i.e., the region in which a bending or torsional moment on prepreg preforms laid up on the support mandrel results in fiber wrinkling. At the same time, the fiber tension region, i.e., the region in which a bending or torsional moment on prepreg preforms laid up on the support mandrel results in fiber spreading, is increased. In other words, the bending behavior of prepreg preforms laid up on the flexible support mandrel according to the invention is advantageously altered in a way that only neutral bending zones or fiber tension regions occur during the bending or torsional movement. The formation of undesired wrinkles in the fiber prepregs is therefore beneficially prevented.

The use of stiffened or reinforced flexible support mandrels in a method for manufacturing curved composite components aids in developing a fully automated and continuous manufacturing process. The manual effort of such processes is significantly reduced, leading to higher throughput, better component quality, less curved components to be discarded and lowered manufacturing costs. The continuous manufacturing process is particularly efficient, if the support mandrel is formed as an endless loop winding around a curvature forming tool and being led back by a return gear. With such an endless support mandrel a system for manufacturing curved composite components may be implemented that allows for the continuous production of curved composite components within the same system.

According to an embodiment of the support mandrel, the support mandrel may further comprise a plurality of reinforcement pillars connected to the reinforcement bar and extending substantially perpendicular to the reinforcement bar and the upper support surface within the mandrel body.

Those reinforcement pillars advantageously aid in improving the positive lock of the reinforcement bar within the mandrel body.

According to a further embodiment of the support mandrel, the stiffness of the reinforcement bar and/or the reinforcement pillars may be higher than a stiffness of the prismatic mandrel body. This allows for movement of the neutral bending axis towards the top of the web portion in the mandrel body, thereby reducing the extent of the pressure region within the mandrel.

According to a further embodiment of the support mandrel, the reinforcement bar may comprise a tubular or rectangular rod.

According to another embodiment of the support mandrel, the support mandrel may further comprise a plurality of spread slots cut into a surface of the mandrel body opposite to the upper support surface. Such spread slots advantageously aid in increasing the tension region of the mandrel since the lower support surface can be spread even further, thereby allowing smaller bending radii.

According to a further embodiment of the support mandrel, the flexible material may comprise an elastomer or a rubber. Elastomeric materials like silicone rubbers are flexible enough to reversibly withstand bending movements, have appropriate heat resistance and may be removed from the curved composite components without damaging the cured parts.

According to a further embodiment of the support mandrel, the two polygonal bases of the mandrel body may have T-shape, I-shape, Z-shape, C-shape, L-shape, Ω-shape, hat shape or trapezoid shape. Such shapes are advantageously used in manufacturing curved stringers, stiffeners, longerons or frames for use in aircraft fuselage structures.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
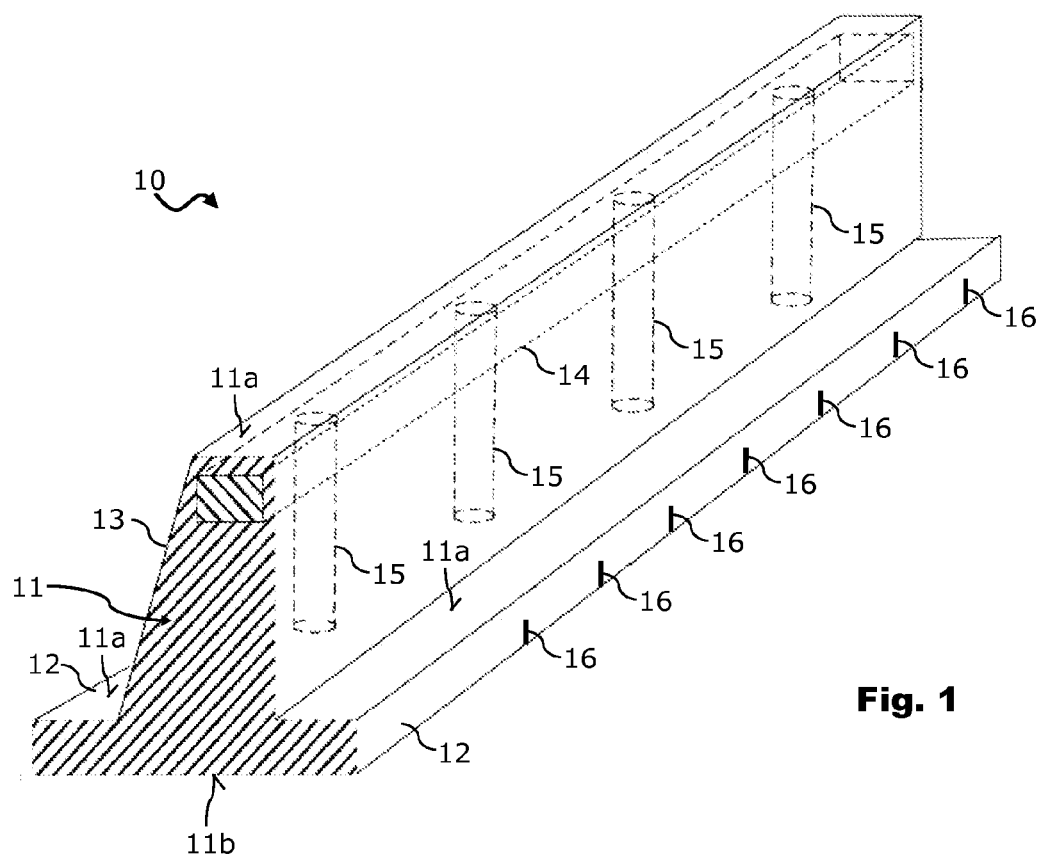
FIG. 1 schematically illustrates a flexible support mandrel according to an embodiment of the invention.

FIG. 1 shows a schematic illustration of a flexible support mandrel 10 that can be used for producing curved composite components from fully or partially laid-up prepreg fiber parts. The support mandrel 10 comprises a prismatoid mandrel body 11 formed from a flexible material. Prismatoid within the meaning of the present application is intended to include any polyhedral three-dimensional bodies having two generally polygonal bases in two parallel planes all vertices of which are comprised within the two parallel planes. The two generally polygonal bases may have a varying outer shape, i.e., the connecting edges of the polyhedron between the two polygonal bases do not necessarily need to be parallel to each other. In a particular embodiment, the prismatoid mandrel body 11 may be a prismatic mandrel body 11, i.e., the two generally polygonal bases being congruent to each other, and being joined at their respectively corresponding sides by side faces with parallel connection edges. For the prismatoid mandrel body 11 the cross sections through the prismatoid mandrel body 11 may vary along the extension of the mandrel body 11, for example in web height of the web portion 13. In the specific case of the prismatic mandrel body 11, however, all cross sections through the prismatic mandrel body 11 parallel to the polygonal bases may be the same.

The mandrel body 11 further comprises an upper support surface 11a that extends between the two polygonal bases of the mandrel body 11. The upper support surface 11a is configured to support a prepreg layup that may be cross-formed to the outer shape of the support surface 11a. Generally opposite the upper support surface 11a, the mandrel body 11 comprises a lower surface 11b.

The shape of the upper support surface 11a may be defined by a web portion 13 and foot portions 12. In the example of FIG. 1, the mandrel body 11 takes on the cross-sectional shape of an Omega (Ω-shape), however, other cross-sectional shapes may be equally possible, such as a T-shape, an I-shape, a Z-shape, a C-shape, an L-shape, a hat shape or a generally trapezoid shape. In order to achieve those shapes, the two polygonal bases of the mandrel body 11 may be appropriately formed with respective web portions 13 and, if applicable, one or more foot portions 12.

Generally, the mandrel body 11 is made from a flexible, solid state material, such as an elastomer or a rubber, for example divinyl rubber, silicone rubber. Any flexible material that may have a relatively low Young's modulus at ambient temperatures may be used for the mandrel body 11.

The support mandrel 10 may further comprise a reinforcement bar 14 enclosed within the mandrel body 11. The reinforcement bar 14 may in particular have a higher stiffness, i.e., a higher Young's modulus than the mandrel body 11. The reinforcement bar 14 may for example be a tubular or rectangular rod extending between the two polygonal bases of the mandrel body 11 substantially parallel and near to the upper support surface 11a of the mandrel body 11.

Upon subjecting the mandrel body 11 to a positive bending moment it will develop an upward curvature, with the material near the top of the mandrel body 11, i.e., near the upper support surface 11a, being placed in compression along the bending axis, and the material near the bottom of the mandrel body 11, i.e., near the lower surface 11b being placed in tension. At the border of the compression region in the top side of the mandrel body 11 and the tensile region in the bottom side of the mandrel body 11, the bending stress becomes zero. The plane of zero stress is also known as the neutral axis of the mandrel body 11. When layers of prepreg strips are formed as a layup on the upper support surface 11a and the support mandrel 10 is bent together with the layup along the longitudinal extension, the layers of prepreg strips are located in the compression region and may experience the formation of wrinkles and buckles.

The provision of the reinforcement bar 14, however, leads to a shift of the neutral axis towards the upper support surface 11a due to its innate resistance to compression. Therefore, the extent of the compression region is lowered in the reinforced support mandrel 10 and a layup of prepreg strips on the upper support surface 11a is less prone to buckle up or throw wrinkles.

In order to achieve a good positive lock of the reinforcement bar 14 within the mandrel body 11, i.e., to prevent a translatory movement of the reinforcement bar 14 within the mandrel body 11 upon bending stress, a plurality of reinforcement pillars 15 may be connected to the reinforcement bar 14. The reinforcement pillars 15 may be tubular or rectangular rods extending substantially perpendicular to the reinforcement bar 14 and the upper support surface 11a within the mandrel body 11 from the upper support surface 11a towards the lower surface 11b. The reinforcement pillars may be spaced apart along the longitudinal axis of the mandrel body 11, for example equidistantly.

In order to improve the stiffening effect of the reinforcement bar 14 and to relieve the lower surface 11b of the mandrel body 11 from tensile stress, a plurality of spread slots 16 may be cut into the lower surface of the mandrel body 11. That way, a bending movement of the mandrel body 11 will result in a cone-like opening of the spread slots 16, thereby allowing for lower bending radii and an even further extension of the tensile region with respect to the compression region of the support mandrel 11.

Figure 2:
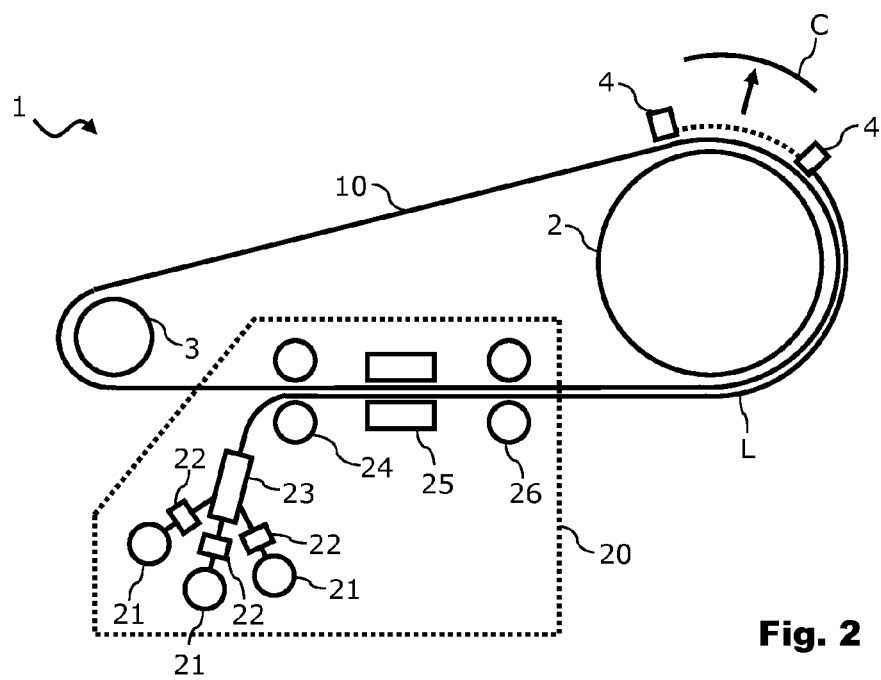
FIG. 2 schematically illustrates a manufacturing system for producing curved composite components according to a further embodiment of the invention.

FIG. 2 schematically illustrates a manufacturing system 1 that may be used for producing curved composite components C. The manufacturing system 1 generally makes use of the support mandrel 10 as shown in FIG. 1. The support mandrel 10 is wound about a forming wheel 2 that may comprise an outer rim formed as a female mold complementary to the male shape of the upper support surface 11a of the mandrel body 11 of the support mandrel 10. The forming wheel 2 is configured to bend the support mandrel 10 and a prepreg layup L formed on the upper support surface 11a to a curved shape. The support mandrel 10 of FIG. 2 may advantageously be formed as an endless loop running around the forming wheel 2 and a return gear 3 in an endless manufacturing chain. To that end the support mandrel 10 of FIG. 1 may be produced in a corresponding length and joined at its two polygonal bases of the mandrel body 11 to form an endless loop which is then wound around the forming wheel 2. The running direction of the support mandrel chain 10 may be in FIG. 2 counter-clockwise. Generally, however, it is also possible to use a manufacturing system 1 that utilizes a support mandrel 10 not connected in an endless loop. To that end, the manufacturing system 1 may not need to comprise a race-track geometry of forming wheel 2 and return gear 3. For example, it may be possible to omit the return gear 3 and simply form curved composite components C by only using an open loop support mandrel 10 and the forming wheel 2.

Figure 3:
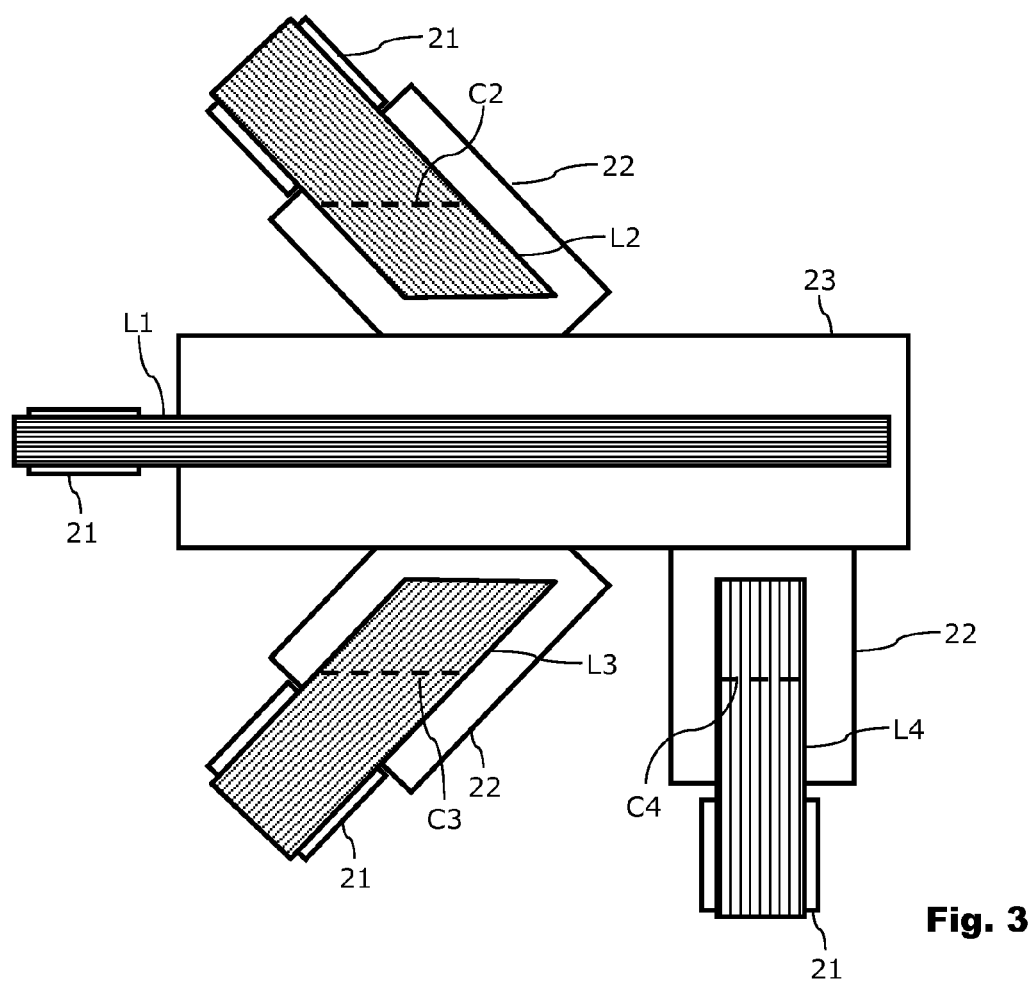
FIG. 3 schematically illustrates a layup forming assembly for the system of FIG. 2 according to a further embodiment of the invention.

A layup forming assembly 20 of the manufacturing system 1 may be provided upstream of the forming wheel 2, i.e., a fixed point on the support mandrel 10 first passes the layup forming assembly 20 and is then transferred over the forming wheel 10. The layup forming assembly 20 is configured to form a prepreg layup L from prepreg strips L1, L2, L3, L4 on the upper support surface 11a of the mandrel body 11 of the support mandrel 10. An example for such a layup forming assembly 20 is schematically illustrated in FIG. 3 in greater detail. Reference is made both to FIGS. 2 and 3 in the following, when explaining the functionality and components of the layup forming assembly 20.

The layup forming assembly 20 may include a plurality of prepreg storages 21 which are configured to store different prepreg strips L1, L2, L3, L4, particularly unidirectional prepreg strips, i.e., prepreg strips with the fibers aligned in one direction only. The prepreg storages 21 may for example comprise storage reels onto with the prepregs are wound up as semi-finished tapes or ribbons. One of the prepreg storages 21 is configured to deliver a unidirectional prepreg strip L1 as continuous semi-finished product onto a layup support 23 configured to support the prepreg layup L in flat form, for example a support foil or similar. The remaining prepreg storages 21 are configured to deliver the prepreg strips L2, L3, L4 under predefined angles with respect to the continuous prepreg strip L1. This ensures that the fiber direction of each of the unidirectional prepreg strips L2, L3, L4 is predefined with respect to the fiber direction of the continuous prepreg strip L1. For example, the prepreg strips L2, L3 may be oriented under an angle of ±45° with respect to the continuous prepreg strip L1, while the prepreg strip L4 may be oriented under an angle of 90° with respect to the continuous prepreg strip L1.

In order to ensure a constant width of the multilayer prepreg layup L in flat form, the prepreg strips L2, L3, L4 may be led over prepreg support units 22 that may include cutting devices configured to cut of rhombi from the continuous prepreg tapes L2, L3, L4. This is indicated with dotted cutting lines C2, C3, C4 in FIG. 3. Thereby, the continuously running prepreg strip L1 is overlaid with pieces of prepreg strips L2, L3, L4 to form the layup L.

The prepreg support 23 with the prepreg layup L in flat form supported on top is then transported to a layup forming tool 24 which is configured to place the prepreg layup L in flat form from the layup support 22 onto the upper support surface 11a of the mandrel body 11. Optionally, the prepreg layup L and the prepreg support 23 may be heated and/or compacted prior to placement onto the mandrel body 11. Additionally, a heating device 25 may be arranged downstream of the layup forming tool 24 and may be configured to heat the prepreg layup L on the upper support surface 11a of the mandrel body 11 prior to cross-forming by a layup cross-forming tool 26 which is configured to cross-form the prepreg layup L to the two-dimensional shape of the upper support surface 11a of the mandrel body 11.

The mandrel body 11 is then guided around the forming wheel 2 under pressure and heat exposure in order to impress the desired curvature of the forming wheel 2 to the mandrel body 11 and the prepreg layup L. A cutting assembly 4 at the end of the forming wheel may be configured to cut the prepreg layup L bent by the forming wheel 2 in curved sections to obtain the curved composite components C. The cut sections of the curved composite components C may then be removed from the manufacturing system 1.

Figure 4:
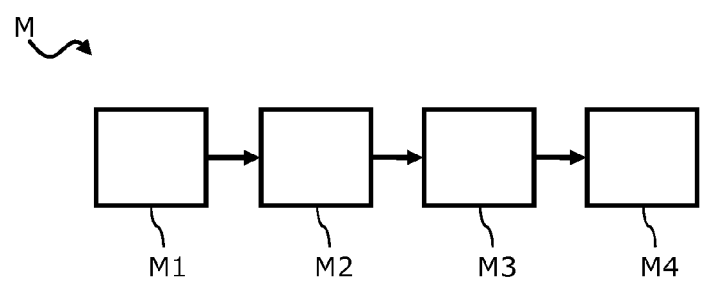
FIG. 4 schematically illustrates a flow diagram of a method for producing curved composite components according to another embodiment.

FIG. 4 schematically illustrates a block diagram for a method M for producing curved composite components C. The method M may in particular be implemented using the support mandrel 10 of FIG. 1 in a manufacturing system 1 as illustrated and explained in conjunction with FIGS. 2 and 3.

At M, a prepreg layup L from prepreg strips L1, L2, L3, L4 may be laid up. This flat prepreg layup L is then cross-formed at M2 on an upper support surface 11a of a support mandrel 10. The support mandrel 10 may in particular comprise a prismatic mandrel body 11 formed from a flexible material, the mandrel body 11 having two polygonal bases and an upper support surface 11a extending between the two polygonal bases of the mandrel body 11, and a reinforcement bar 14 enclosed within the mandrel body 11 and extending between the two polygonal bases of the mandrel body 11 substantially parallel and near to the upper support surface 11a of the mandrel body 11. At M3, the support mandrel 10 and the prepreg layup L on the upper support surface 11a are bent with a forming wheel 2. Optionally, the bent prepreg layup L may be cut in in curved sections at M4, in order to obtain the curved composite components C.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A support mandrel for producing curved composite components, comprising:
   a prismatoid mandrel body formed from a flexible material, the mandrel body having two polygonal bases and an upper support surface extending between the two polygonal bases of the mandrel body;
   a reinforcement bar enclosed within the mandrel body and extending between the two polygonal bases of the mandrel body substantially parallel and near to the upper support surface of the mandrel body; and
   a plurality of reinforcement pillars connected to the reinforcement bar and extending substantially perpendicular to the reinforcement bar and the upper support surface within the mandrel body.

2. The support mandrel according to claim 1, wherein the stiffness of at least one of the reinforcement bar and the reinforcement pillars is higher than a stiffness of the prismatoid mandrel body.

3. The support mandrel according to claim 1, wherein the reinforcement bar comprises a tubular or rectangular rod.

4. The support mandrel according to claim 1, further comprising a plurality of spread slots cut into a surface of the mandrel body opposite to the upper support surface.

5. The support mandrel according to claim 1, wherein the flexible material comprises an elastomers or a rubber.

6. The support mandrel according to claim 1, wherein the two polygonal bases of the mandrel body have one of a T-shape, I-shape, Z-shape, C-shape, L-shape, Ω-shape, hat shape and trapezoid shape.

7. A system for producing curved composite components, comprising:
   a support mandrel, comprising:
   a prismatoid mandrel body formed from a flexible material, the mandrel body having two polygonal bases and an upper support surface extending between the two polygonal bases of the mandrel body;
   a reinforcement bar enclosed within the mandrel body and extending between the two polygonal bases of the mandrel body substantially parallel and near to the upper support surface of the mandrel body; and
   a plurality of reinforcement pillars connected to the reinforcement bar and extending substantially perpendicular to the reinforcement bar and the upper support surface within the mandrel body;
   a layup forming assembly configured to form a prepreg layup from prepreg strips on a flat surface and to transfer the prepreg layup to the upper support surface of the mandrel body of the support mandrel; and
   a forming wheel configured to bend the support mandrel and a prepreg layup formed on the upper support surface to a curved shape.

8. The system according to claim 7, wherein the support mandrel is joined at its two polygonal bases of the mandrel body to form an endless loop which is wound around the forming wheel.

9. The system according to claim 7, wherein the forming wheel comprises an outer rim formed as a mold complementary to the shape of the upper support surface of the mandrel body of the support mandrel.

10. The system according to claim 7, wherein the layup forming assembly comprises:
    a plurality of prepreg storages configured to store the prepreg strips;
    a layup support configured to support the prepreg layup in flat form;
    a layup cross-forming tool configured to cross-form the prepreg layup to the two-dimensional shape of the upper support surface of the mandrel body.

11. The system according to claim 10, wherein the layup forming assembly further comprises:
    a layup forming tool configured to place the prepreg layup in flat form from the layup support onto the upper support surface of the mandrel body; and
    a heating device configured to heat the prepreg layup on the upper support surface of the mandrel body prior to cross-forming by the layup cross-forming tool.

12. The system according to claim 7, further comprising:
    a cutting assembly configured to cut the prepreg layup bent by the forming wheel in curved sections to obtain the curved composite components.

13. A method for producing curved composite components, the method comprising:
    laying up a prepreg layup from prepreg strips;
    cross-forming the prepreg layup on an upper support surface of a support mandrel, the support mandrel comprising a prismatoid mandrel body formed from a flexible material, the mandrel body having two polygonal bases and an upper support surface extending between the two polygonal bases of the mandrel body, a reinforcement bar enclosed within the mandrel body and extending between the two polygonal bases of the mandrel body substantially parallel and near to the upper support surface of the mandrel body, and a plurality of reinforcement pillars connected to the reinforcement bar and extending substantially perpendicular to the reinforcement bar and the upper support surface within the mandrel body; and bending the support mandrel and the prepreg layup on the upper support surface with a forming wheel.

14. The method according to claim 13, the method further comprising cutting the prepreg layup bent by the forming wheel in curved sections to obtain the curved composite components.

* * * * *